United States Patent [19]

Henn et al.

[11] Patent Number: 5,143,196
[45] Date of Patent: Sep. 1, 1992

[54] PRODUCTION OF GLAZINGS ON A PRODUCTION LINE COMPRISING SEVERAL WORKSTATIONS

[75] Inventors: Klaus Henn; Ansgar Elfgen; Ludwig Schwartz; Helmut Krumm, all of Aachen, Fed. Rep. of Germany

[73] Assignee: Saint Gobain Vitrage International, Courbevoie, France

[21] Appl. No.: 626,366

[22] Filed: Dec. 12, 1990

[30] Foreign Application Priority Data

Dec. 14, 1989 [DE] Fed. Rep. of Germany ....... 3941277

[51] Int. Cl.⁵ ............................................. B65G 37/00
[52] U.S. Cl. .............................. 198/345.3; 198/465.2; 198/803.01
[58] Field of Search ............... 198/345.1, 465.1, 465.2, 198/465.3, 803.01, 345.3

[56] References Cited

U.S. PATENT DOCUMENTS

| | | |
|---|---|---|
| 3,430,328 | 3/1969 | Powell . |
| 3,555,737 | 1/1971 | Terakado et al. . |
| 3,860,125 | 1/1975 | Johnson et al. . |
| 4,149,620 | 4/1979 | Rosensweig ................. 198/345.2 |
| 4,278,381 | 7/1981 | Blomquist et al. . |
| 4,347,927 | 9/1982 | Landes . |
| 4,371,103 | 2/1983 | Siemens et al. . |
| 4,502,585 | 3/1985 | Sticht ........................... 198/345.3 |
| 4,662,503 | 5/1987 | Lycke ........................... 198/345.3 |
| 4,698,088 | 10/1987 | Bando . |
| 4,770,120 | 9/1988 | Komatsu et al. ........... 198/345.1 X |
| 4,799,586 | 1/1989 | Kutzli et al. ............... 198/345.3 X |
| 4,881,633 | 11/1989 | Cailey et al. .................. 198/345.1 |

FOREIGN PATENT DOCUMENTS

| | | |
|---|---|---|
| 0315202 | 10/1989 | European Pat. Off. . |
| 2741647 | 4/1978 | Fed. Rep. of Germany . |
| 2918986 | 11/1980 | Fed. Rep. of Germany . |
| 3124972 | 3/1982 | Fed. Rep. of Germany . |
| 2945682 | 6/1982 | Fed. Rep. of Germany . |
| 2484393 | 12/1981 | France . |

OTHER PUBLICATIONS

Bosch, "Bosch Flexible Automation" (Nov. 1983) (without translation).
Siemens "A System for Storage of Parts and Pallets" (Dec. 1984) (Without Translation).
OKV Company Prospectus (Mar. 1989) (Without Translation).

*Primary Examiner*—D. Glenn Dayoan
*Attorney, Agent, or Firm*—Pennie & Edmonds

[57] ABSTRACT

A glazing production line includes a plurality of workstations at which tasks are performed on glass sheets, and a conveying system for transporting the glass sheets to each workstations, including at least one mobile support. An attachment system is utilized to attach the glass sheet to the mobile support, and a positioning system is utilized to precisely arrange the glass sheet, which is attached to the mobile support, relative to the workstation so that the task can be performed on the sheet.

24 Claims, 6 Drawing Sheets

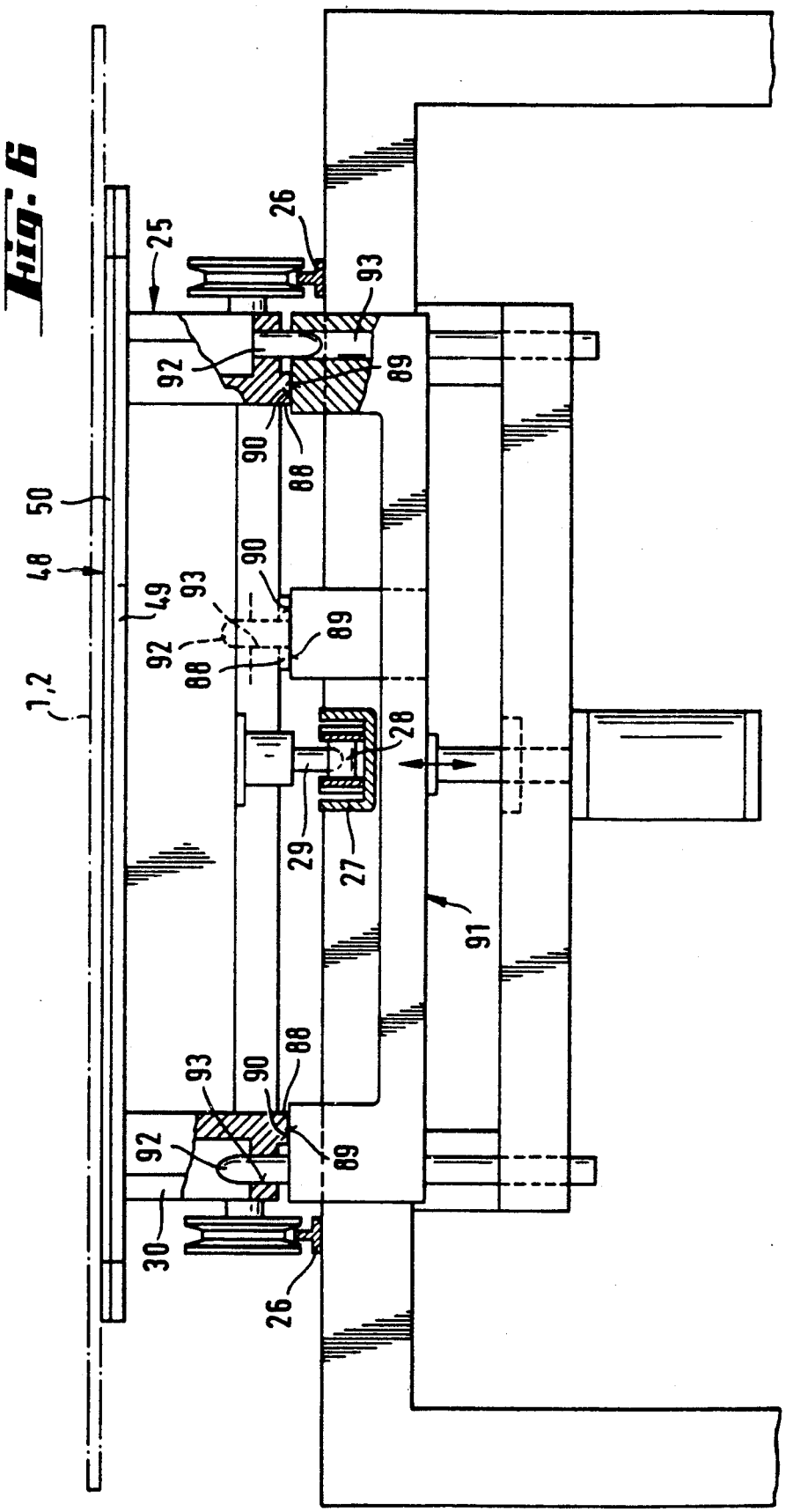

PRODUCTION OF GLAZINGS ON A PRODUCTION LINE COMPRISING SEVERAL WORKSTATIONS

BACKGROUND OF THE INVENTION

The invention relates to an automated multi-step process for the production of glazings.

Multi-step production lines have previously been used in the manufacture of automobile glazings. German Patent Publication No. 29 45 682 C2 describes a series of workstations including a cutting station where a linear score is made on a rectangular blank, and a break-off station where the blank is broken at the score. Prior art production lines also typically comprise stations for grinding the edges of a glass sheet, measuring the contour of the glass sheet, making holes, and inscribing indicia on the glass sheet. Production lines for laminated glazings can also include stations which assemble glazings and glazing components, or equip already assembled glazings with accessories such as frames, mirror bases, attachment clamps or other parts.

Conveyance of glass sheets in the prior art is performed on horizontal conveyors where the sheets rest on belts, conveyor rollers or other similar devices. In these conveyor systems, the sheets must be positioned at every work station in a specific orientation to insure proper completion of the task. To do this, stops are provided which act on the edges of the glazing to force the glazing into the desired position. Unfortunately, such use of stops causes the sheets to slide somewhat on its bottom side, which can lead to surface flaws (i.e. scratches, abrasions, etc.) and even to broken sheets.

Automated positioning of workpieces at the various workstations is known in other arts. For example, German Patent Publication No. 27 41 647 A1 describes a production line comprising multiple workstations, and hence, multiple work tools. Here, workpieces are attached to pallets which are routed to the workstations on vehicles. More specifically, the vehicles comprise a rotating platform utilized to drop off pallets having completed workpieces and to pick up pallets having workpieces which require work. Additionally, some production lines include handling units used to automatically position workpieces at the workstations, which allows for good precision during positioning. This technology is described in greater detail in a prospectus DE of the BOSCH company entitled Bosch Flexible Automation, 11/83.

In a prospectus of the Siemens Company entitled "A System For Storage of Parts and Pallets," 1984, an automated production line is described in which workpieces are conveyed to separate workstations via magazines from which they are removed and positioned on the production machines. Finally, assembly automatons are known wherein a collection of parts pass through various workstations which perform the required assembly tasks. This procedure is described in detail in a prospectus DE of the OKV company, 1989.

Thus, the prior art includes several techniques for the economic and efficient assembly of various parts. However, no such system exists for glazings.

SUMMARY OF THE INVENTION

Therefore, an objective of the invention is to perform a plurality of tasks on glass sheets in an automated series of workstations without having the risk of inflicting surface flaws or breaks to the glass sheets or glazings.

This object is achieved by attaching the glass sheet to a mobile support on which the glass sheet is transported to each workstation in a production line. Once at a workstation, the mobile support is properly positioned to allow the required task to be performed on the attached glass sheet. This method of transporting the sheets around the production line eliminates the prior art problem of slippage between the sheet and the carrying surface of the conveyor. The mobile support transports the sheet while maintaining it in a required position (i.e., a flat or bent position). The mobile support is positioned at each workstation, immobilized in a predetermined position during the corresponding production stage. In this way, the glass sheet contacts only a single conveying element, in this case the support, on which it remains without relative displacement, thus considerably reducing risk of damage.

There are many other advantages associated with the invention such as improving the precision of positioning the glazing. In the prior art, positioning depended on the quality of the work at the preceding workstations since the positioning means acted on the edge of the glazing itself. However, in the process according to the invention, proper positioning is achieved in the sheet by utilizing reference points on the support itself. This support is designed to fit with the workstation, and is therefore always exact. This eliminates the positioning mistakes made in the prior art because of the cumulative effect of various tolerances required at each station as well as the mechanical play experienced by the glass sheet. Moreover, the invention makes it possible to shorten the duration of the positioning operations at the various workstations because centering of the mobile support can be performed in a shorter amount of time than centering of the sheets themselves. Additionally, the mobile support accommodates more rapid acceleration and deceleration, which acts to shorten the approach time of the glazing to the work station and hence, shortens the production time as a whole.

Another advantage of the invention is the increased ability to vary the arrangement of the workstations. While in the prior art, transporting of the glass sheets is performed on rectilinear horizontal conveyor belts, the mobile support arrangement allows for movement of the glazings in any direction. For example, the mobile support can be made to follow workstations arranged in a circular path. The invention also makes it possible to superpose the workstations, or to place a part of the production line at a different angle from the balance of the line. It is recommended, however, to place the glazings in a horizontal orientation on workstations oriented horizontally. Of course, it is possible to attach them to the mobile support in any way desired depending on the arrangement and working modes of the various production tools at the workstations.

The process according to the invention is particularly advantageous when the tasks performed at the workstations do not require a support table, for instance, cutting the glass sheet with heat, or grinding the edges of the sheet. When a support table is required for a certain task (i.e., breaking off scored edges of the glazing), it is necessary to provide corresponding apparatus able to support the glazings.

BRIEF DESCRIPTION OF THE DRAWINGS

These and other objects, features and advantages of the present invention will be more readily apparent from the following Detailed Description of a Preferred Embodiment in which:

FIG. 6 is a diagrammatic illustration of a centering device for the mobile support.

DETAILED DESCRIPTION OF A PREFERRED EMBODIMENT

Figure 1:
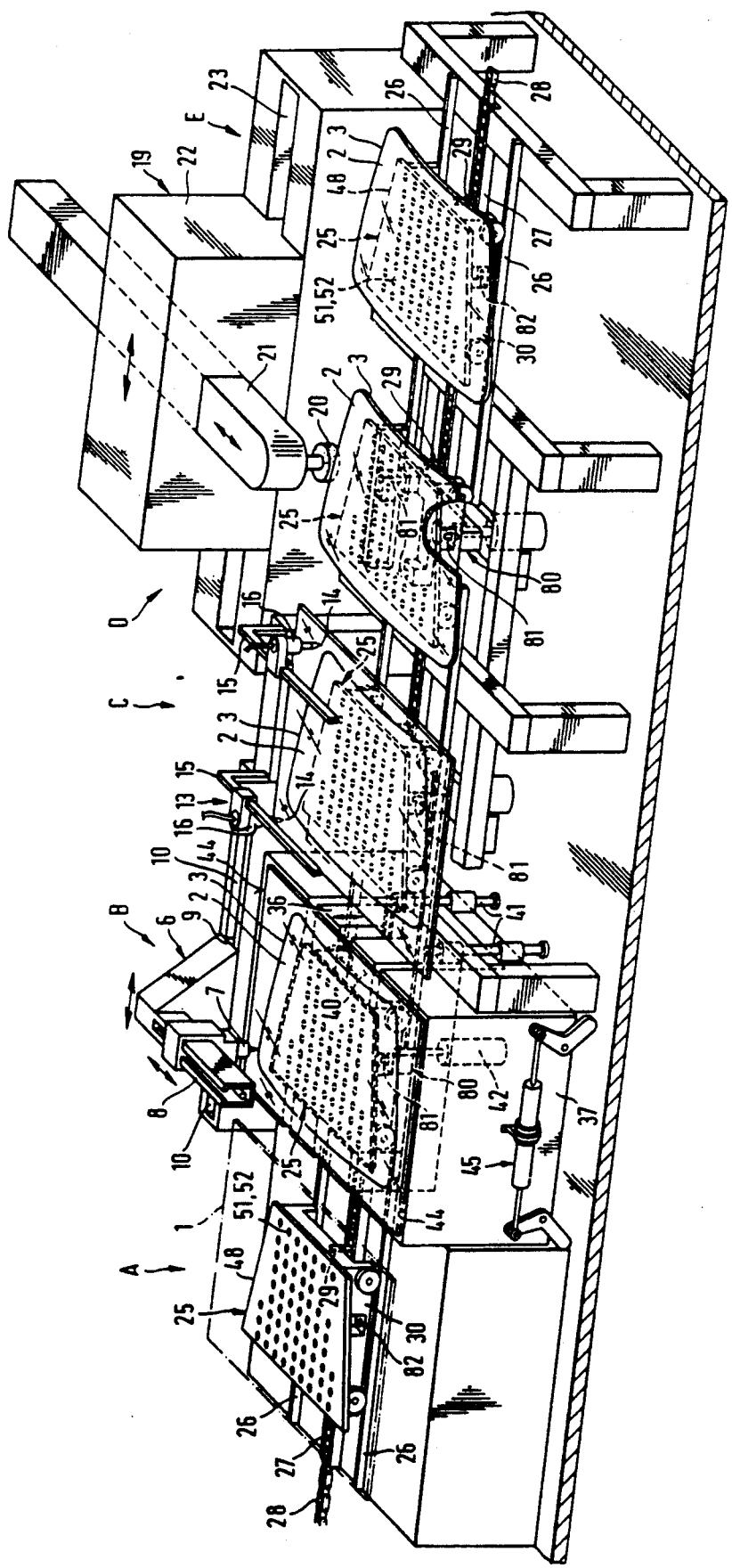
FIG. 1 is a perspective view of a production line of the invention.

FIG. 1 depicts a production line utilized to manufacture automobile glazings from glass sheets comprising a loading station A, a cutting station B, a breaking station C, a grinding station D and an unloading station E. On this production line, rectangular glass blanks 1 are cut into glass sheets 2 of a predetermined shape 3 and ground along the contour of the shape. At the unloading station E, sheets are removed from the production line where they can be stacked in an intermediate magazine or transferred to another production line.

In this particular production line, the various workstations are spaced evenly and run simultaneously. Therefore, there is a sheet at each station. When the processes are completed at each work station, all the sheets are transported to the next station by a mobile support. Thus, the production line as a whole is used in an optimal way.

It is possible to use standard machines of the art as production machines. In the embodiment shown, the cutting machine 6 at the cutting station B is a standard cutting machine which moves on cross slides to produce a score on sheet 1. A cutting head 7 moves crosswise to the axis of the production line on a bridge 8 which rests on a bed 9 and moves laterally along slide 10. All motions are numerically controlled. In this manner, the cutting machine forms contour 3 on sheet 1.

The machine utilized to break off scored edges 13 at the breaking station C comprises four gas burners 16 directing their flames 14 to the scored edges of sheet 1. These flames locally heat the scored surface thereby causing strong thermal stresses there. As a result, these edges break at the score and are detached from newly formed glazing 2 outside contour 3. The debris is removed in a suitable way.

At the grinding station D, a grinding automaton 19 run by numerical control is transported by cross slides. Grinding wheel 20 moves crosswise on a carriage 21, carried by a saddle 22 and also moves laterally on slides 23.

Mobile supports 25 are utilized to transport the glass sheets within the production line, to properly position them and to maintain the proper position at the various workstations. These supports 25 rest on rails 26 on which they move through the various workstations. The mobile supports 25 are transported by means of drive dogs 29 attached thereto engaging drive chain 28. The chain slides forward within casing 27 thereby pulling the mobile supports forward to the workstations.

Each support 25 comprises one or more carrying plates 48 resting on frames 30. The plates are designed to receive the glass sheets. Additionally, each support includes a suction device utilized to maintain the position of the glass sheet constant relative to the support. Various embodiments of carrying surfaces and suction devices are described in more detail later in connection with FIGS. 3 and 4. In the case where the production line is used to manufacture single glass sheets a precise positioning of glass sheet 1 onto mobile support 25 at loading station A is unnecessary because the edges of the glazings will be cut and detached at the next two workstations, thus rendering an exact positioning by the time the glass sheet enters station D. In the case, however, where various glass sheets are to be superposed as in the manufacture of laminated glazings, it is necessary to precisely position a glass sheet 1 relative to support 25 at loading station A before attaching it to the support by use of suction devices. Ordinary positioning elements of the art are utilized for this purpose.

Means are provided for precisely positioning the mobile supports 25 relative to the workstations because it is essential to have a predictable workpiece location at each station in order to obtain proper results with the numerically controlled tools. In the embodiment disclosed in the present application, each workstation has a centering device 33 including a retractable centering rod 31 which is mated with a centering bore 32 provided on the mobile support.

When the glass sheets have been processed at every workstation, they are removed from the support at unloading station E. Automatic control devices are provided at unloading station E to detach the suction devices from the sheets. The glazings can thus be separated from the carrying plates of the support and the free support can be routed to station A to receive a new glass blank, thus completing a closed loop operation of the mobile supports.

Figure 2:
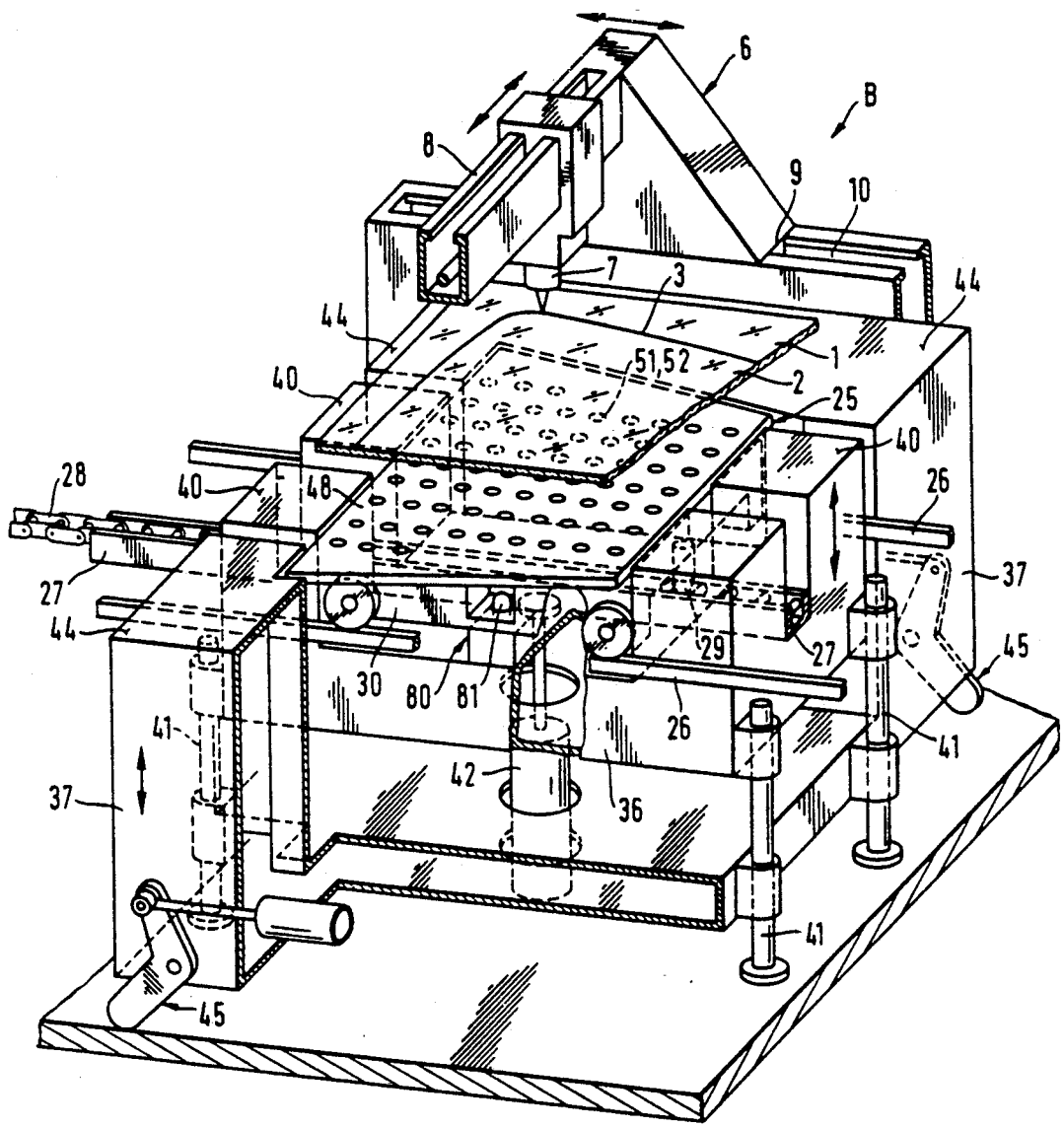
FIG. 2 is more detailed perspective view of the cutting station illustrated in FIG. 1.

In order to work the edges of the glass sheets, the carrying surface of mobile supports 25 intended to support these sheets is made smaller than the sheets. Therefore, the marginal zone of the glass sheet projects outside of the support perimeter. However, in some tasks it is necessary to provide a table support in the workstation in addition to the mobile support in order to support these marginal zones. For example, in cutting station B, the cutting tool exerts a vertical force on the unsupported region of the glass, and therefore needs an alternate table support to avoid damaging the glass. FIG. 2 illustrates a table support utilized with cutting station B comprising an elevating table having an inner part 36 and an outer part 37, operating independently of inner part 36. Inner part 36 has a carrying face 40 which supports the glass sheet near the longitudinal axis of the cutting station and in particular in an area corresponding to the width of frame 30 of support carriage 25. This inner part 36 of the cutting table is supported by vertical guide columns 41 and moves by an elevating device 42. When the station is in use for cutting, inner support 36 is maintained in an elevated position and thereby supports the front and back of the glass sheet in its central region. All other times, it is lowered so that frame 30 of support carriage 25 can pass through the cutting station. The inner part 36 includes the centering device 33, in which the centering measuring rod 31 mates with a corresponding centering bore on frame 30 of mobile support 25 during the elevation of this part, and therefore assures the precise centering of carriage 25 at the workstation.

Outer part 37 of the cutting table has support faces 44 and is raised or lowered by eccentric element 45 to either an upper work position or a lower rest position. In the upper work position, the sides of the glass sheet are supported by faces 44. The range of elevation in the outer part 37 is considerably less than the range of elevation of the inner part 36 because outer part 37 is outside the area under frame 30 of mobile support 25. Therefore, it only needs to be moved downward so that the mobile support can clear the workstation in transport.

Figure 3:
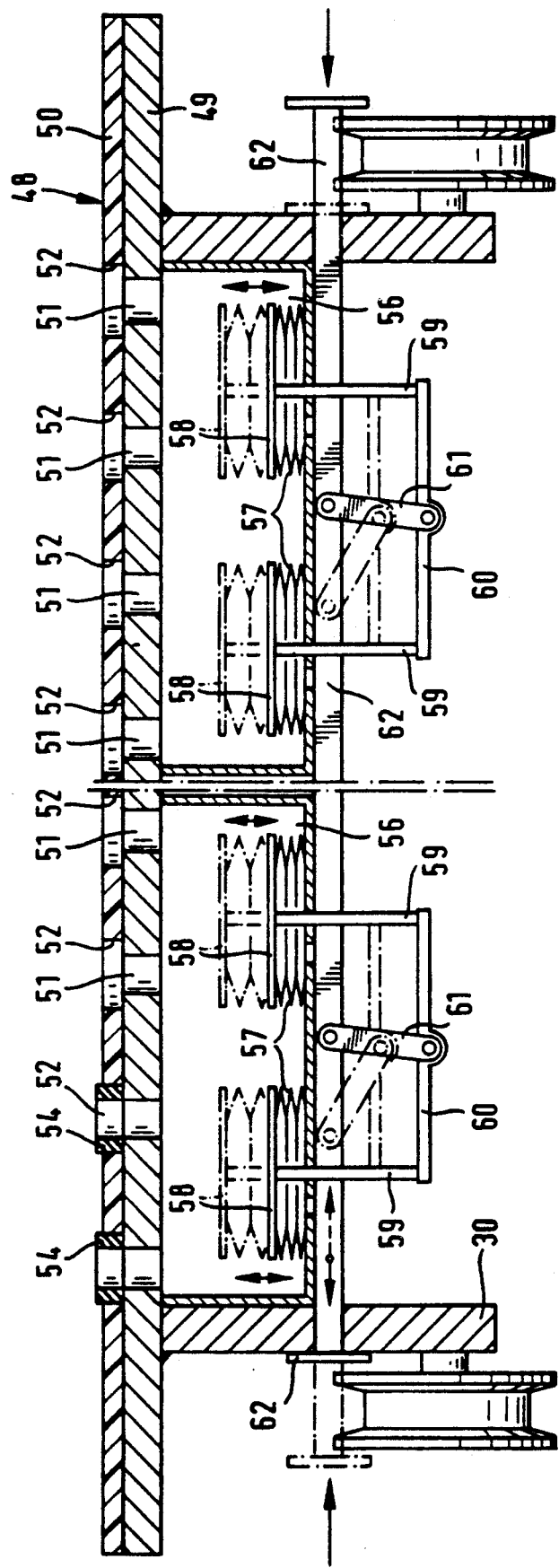
FIG. 3 is a diagrammatic illustration of a mobile support having mechanically controlled attachment means.
Figure 4:
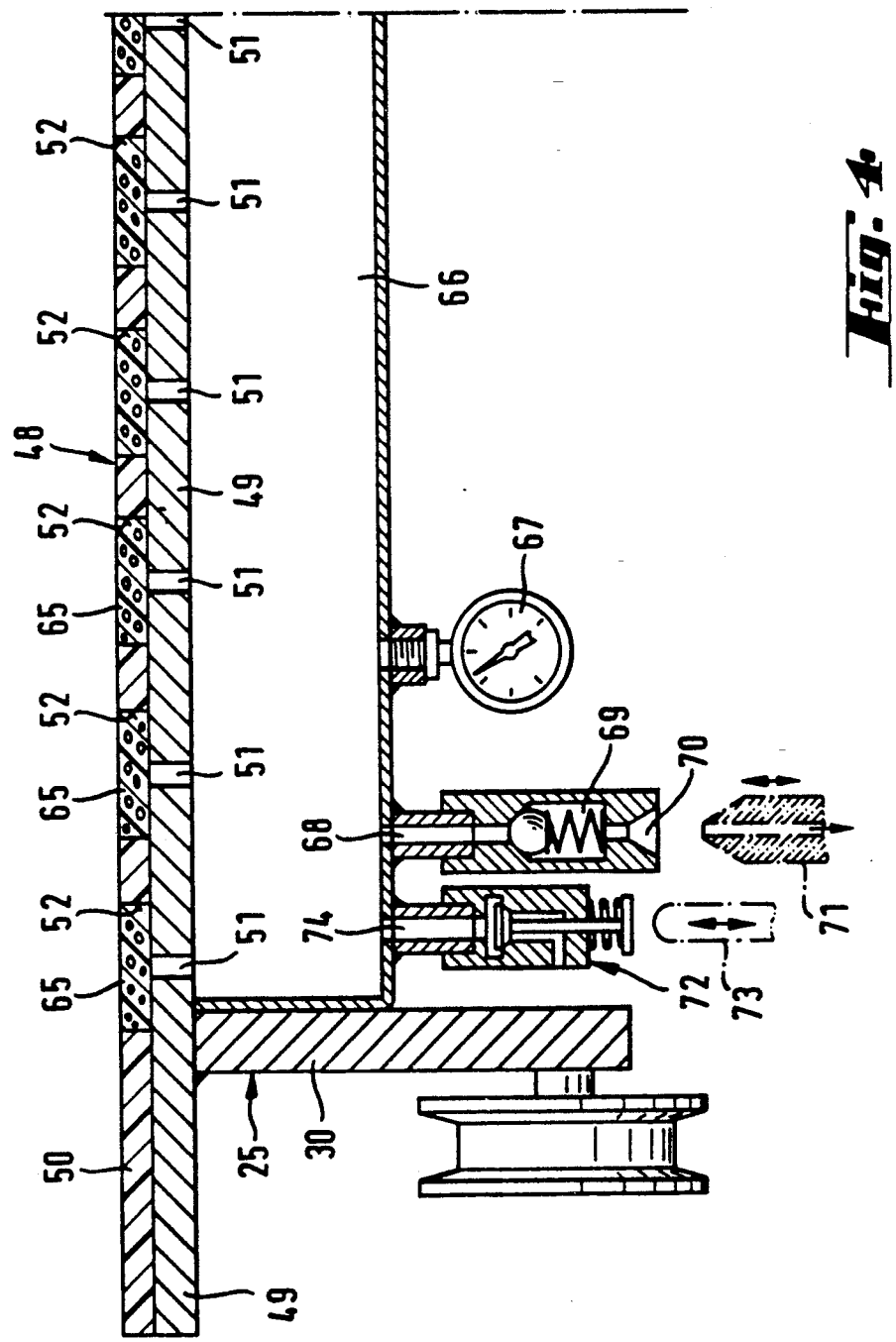
FIG. 4 is a diagrammatic illustration of a mobile support having pneumatically controlled attachment means.

Different designs of support carriages 25 are shown in FIGS. 3 and 4. In each design, a carrying plate 48 is attached to each mobile support frame 30, thus supporting the glass sheets and preventing them from bending in an undesirable way. Typically, the carrying plate is designed to be slightly smaller than the glass sheet it is carrying. This plate is particularly advantageous during working of relatively thin glass sheets. However, for relatively thick sheets it can be sufficient to rest the sheets on thick suction cups for attachment. In one embodiment, carrying plate 48 comprises a metal plate 49 coated with an elastic layer 50 of an elastomer material. A series of apertures 51 and 52 extend through the plate from an airtight chamber 56. Elastic layer 50 creates an airtight seal around apertures 51 and 52 when the glass sheet is placed atop the layer. If the elasticity of layer 50 is insufficient to guarantee a good seal, sealing rings 54 comprising a softer elastic material are placed inside apertures 52.

In FIG. 3, mechanical means are utilized to create a partial vacuum in chamber 56, thereby attaching glass sheet to the mobile support via suction forces. By displacing (i.e., compressing) airtight bellows 57, the net volume in chamber 56 (i.e., the volume exclusive of that encompassed by bellows 57) is increased while the amount of air in chamber 56 remains the same. As a result, a partial vacuum is created. Each of bellows 57 is provided with a rigid upper plate 58 which is moved by a traction rod 59. A link 61 acts on rod 59 via a connecting bar 60. In operation at loading station A, a control element acts on a lever 62 to position link 61. Link 61 moves rod 59 downwards thus displacing plate 58 and crushing bellows 57. The compression of bellows 57 creates a partial vacuum in chamber 56, thus attaching the glass sheet to the mobile support 25. At unloading station E, controls are utilized to move lever 62 to the opposite position, thereby releasing the vacuum.

From FIG. 4, pneumatic means are utilized to create a partial vacuum in airtight chamber 56. Again, the carrying plate 49 comprises a metal plate provided with apertures 51 and an elastomer layer 50 provided with apertures 52. Apertures 52 are filled with a plastic (i.e. foam or rubber foam) utilized to help support the glass sheets. A pipe 68 connects chamber 66 to quick coupling 70 by a one-way value 69. Loading station A includes a central vacuum pump which connects to quick coupling 70 via opposing part 71 when mobile support 25 is at Station A. Thus, tank 66 is put under a partial vacuum at Station A which can be monitored by pressure gage 67. At unloading station E, valve 72, controlled by a switch 73, lets air into chamber 66 via pipe 74 and thereby releases the partial vacuum and detaches the glass sheet from mobile supports.

Figure 5:
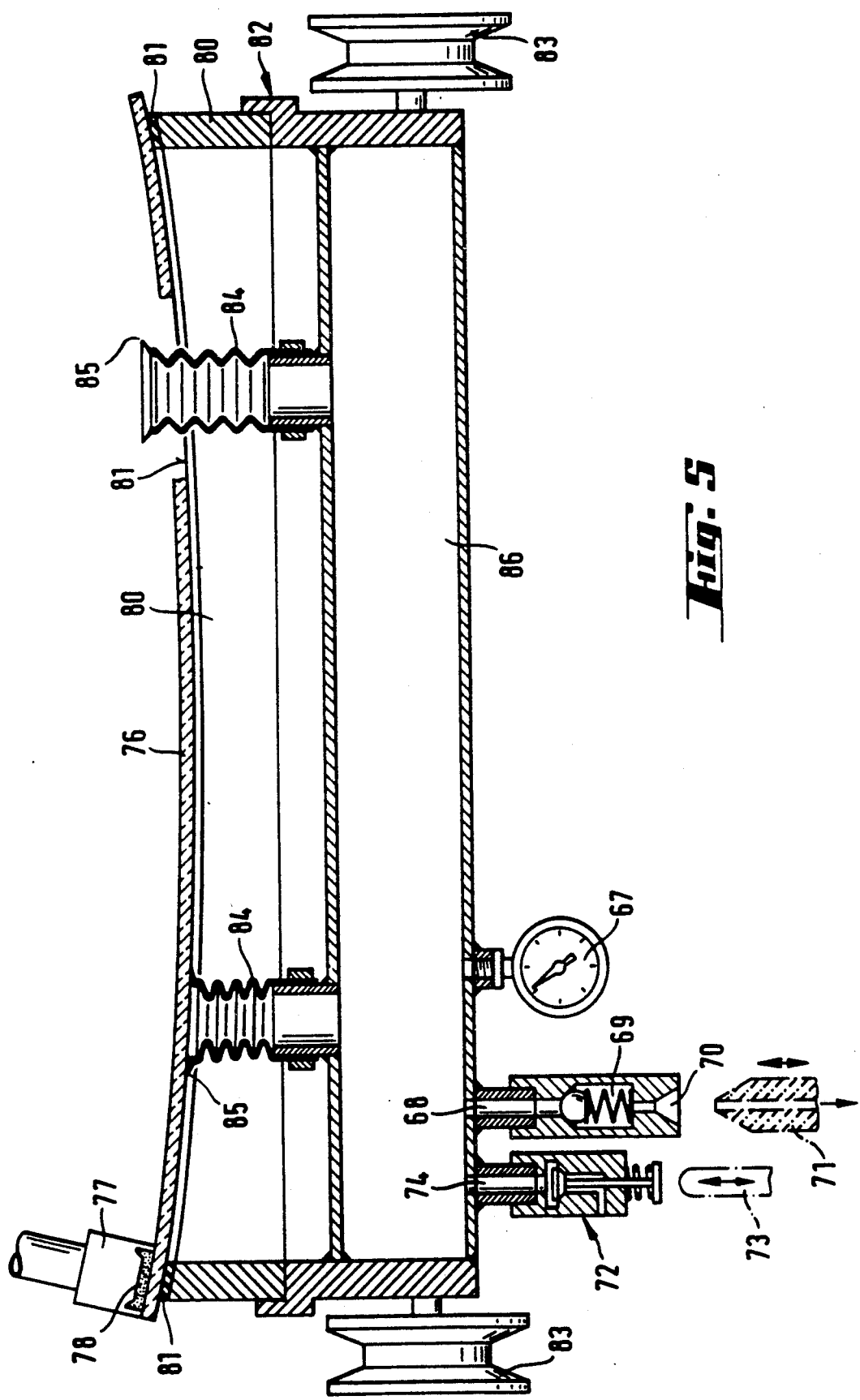
FIG. 5 is a diagrammatic illustration of a mobile support adapted to carry a curved glass sheet.

FIG. 5 illustrates an embodiment of a mobile support suited for carrying a curved glass sheet 76. The sheet 76 includes a profiled cord 78 along its edge produced by an extrusion nozzle 77 from an adhesive hardening compound. Such a production line typically comprises three workstations: a first station where the perimeter of the sheet 76 is cleaned, a second station where the perimeter receives an adhesion priming layer, and a third station where a profiled cord 78 is placed on the glass sheet with an extrusion nozzle 77. Glass sheet 76 rests on an interchangeable carrying frame 80 along its perimeter. The face of carrying frame 80 is adapted to correspond to the shape of the glass sheet and is provided with an elastic layer 81. Carrying frame 80 rests on support carriage 82 where it can be exchanged for other carrying frames of different shapes. Carriage 82 is provided with rollers 83 which run on corresponding rails in a similar fashion to mobile support 25.

Suction devices are placed on support carriages 82 to attach glass sheet 76 to frame 80. These suction devices can include structure adapted for a desired application. In the illustrated embodiment, the suction devices comprise bellows 84 having elastic folds which are open on top, and a flexible elastic lip 85 made of rubber. This lip connects to an airtight chamber 86. When carrying frame 80 is not attached to a glazing, the ends of bellows 84 project above the carrying surface of carrying frame 80. After glazing 76 is placed on frame 80, lip 85 seals against the underside of glazing 76 and a partial vacuum is created in chamber 86 via valve 69. At the unloading station, valve 72 acts in a similar manner as described in connection with FIG. 4.

From FIG. 6, a detailed illustration of one embodiment of a centering device for the mobile support 25 includes stop elements 88 having horizontal stop faces 89 which arrest bearing surfaces 90 belonging to a centering element 91 on the workstation. As the centering element is lifted to the desired height after the arrival of the mobile support 25, stop faces 89 and stop bearing surfaces 90 adjoin. Additionally, centering measuring rods 92 mate with corresponding centering bores 93, so that the positioning of the mobile support is performed in three dimensions with the desired precision. Of course, many other embodiments for centering the mobile support are possible. For example, centering can even be performed without contact.

While it is apparent that the invention herein disclosed fulfills the objects above stated, it will be appreciated that numerous embodiments and modifications may be devised by those skilled in the art, and it is intended that the appended claims cover all such modifications and embodiments as fall within the true spirit and scope of the present invention.

What is claimed is:

1. A method for producing glazings on a production line having a plurality of workstations, each workstation performing a task on a glass sheet, comprising
attaching said glass sheet to a mobile support at a first of a said workstations, said glass sheet on its periphery extending beyond the mobile support,
transporting said glass sheet to each of said workstations in succession by moving said mobile support,
positioning said mobile support and therefore the glass sheet attached thereto in a desired working position in at least one of said workstations,
supporting the entire periphery of the glass sheet in a desired working position in at least one of said workstations, and removing said glass sheet from said mobile support at a last of said workstations.

2. The method according to claim 1 wherein said glass sheets are attached to said mobile support in a predetermined position relative to said mobile support.

3. An apparatus for producing glazings on a production line comprising
   a plurality of workstations at which tasks are preformed on glass sheets,
   a conveying system for transporting said glass sheets to each of said workstations, said conveying system comprising a plurality of mobile supports and means for moving said supports through said workstations,
   an attachment system for attaching said glass sheets to said mobile supports, said glass sheet on its periphery extending beyond said mobile support,
   a positioning system for precisely arranging said mobile supports and therefore the glass sheets which are attached thereto within said workstations so that said tasks can be performed on said sheets, and
   means for supporting the entire periphery of the glass sheet in a desired working position in at least one of said workstations.

4. The apparatus according to claim 3 wherein said mobile supports are spaced along said conveying system so that said production line comprises a mobile support at every workstation.

5. The apparatus according to claim 3 wherein said mobile supports move in a closed loop.

6. The apparatus according to claim 3 wherein each of said mobile supports further comprise a carrying plate having a length and width utilized to support said glass sheet on said mobile support.

7. The apparatus according to claim 6 wherein said carrying plate is shaped to follow a curve on said glass sheet.

8. The apparatus according to claim 6 wherein said carrying plate is removable from said mobile support and replaceable by a carrying plate of another shape.

9. The apparatus according to claim 3 wherein each of said mobile supports further comprises a carrying frame.

10. The apparatus according to claim 3 wherein said attachment system comprises at least one suction apparatus positioned within said mobile support that interacts with said glass sheet.

11. The apparatus according to claim 10 wherein said suction apparatus acts in cooperation with a chamber existing under partial vacuum to exert an attachment force on said glass sheet.

12. The apparatus according to claim 11 further comprising mechanical means utilized to impart a partial vacuum on said chamber.

13. The apparatus according to claim 12 wherein said mechanical means comprises a bellows.

14. The apparatus according to claim 11 further comprising pneumatic means utilized to impart a partial vacuum on said chamber.

15. The apparatus according to claim 14 wherein said pneumatic means comprise a plurality of valves.

16. The apparatus according to claim 3 wherein said positioning system further comprises a centering elevating element utilized to precisely position said mobile support at said workstation.

17. The apparatus according to claim 16 wherein said centering elevating element comprises measuring rods and centering bores on said mobile support adapted to mate with corresponding measuring rods and centering bores on said workstation.

18. The apparatus according to claim 16 further comprising a horizontal stop surface for added support in a vertical direction.

19. The apparatus according to claim 3 wherein the supporting means comprises an elevating table having carry faces utilized to support said glass sheet around its periphery.

20. The apparatus of claim 19 wherein said elevating table further comprises an inner part comprising a carry face utilized to support opposing sides of said glass sheet in a central region in the path of the mobile supports in the conveying system, and an outer part comprising a carry face used to support said glass sheet on opposite sides of said central region outside the path of the mobile supports.

21. The apparatus of claim 3 wherein the conveying system further comprises at least one guide means along which the mobile supports move in a predetermined path and the supporting means comprises an elevating table having a first part located in the path of the mobile supports and a second part located out of the path of the mobile supports and means for moving said first and second parts separately.

22. The apparatus of claim 21 wherein the first part of the elevating table is moved into support of the glass sheet from a position below the path of the mobile supports.

23. An apparatus for producing glazings on a production line comprising
   a plurality of workstations at which tasks are preformed on glass sheets,
   a conveying system for transporting said glass sheets to each of said workstations, said conveying system comprising a plurality of mobile supports and means for moving said supports through said workstations,
   an attachment system for attaching said glass sheets to said mobile supports, said attachment system comprising at least one mechanical means positioned within said mobile support that acts in cooperation with a chamber to impart a partial vacuum on said chamber to exert an attachment force on said glass sheet, and
   a positioning system for precisely arranging said mobile supports and therefore the glass sheets which are attached thereto within said workstations so that said tasks can be performed on said sheets.

24. The apparatus according to claim 23 wherein said mechanical means comprises a bellows.

* * * * *